(12) United States Patent
Gondoh et al.

(10) Patent No.: US 11,643,538 B2
(45) Date of Patent: May 9, 2023

(54) THERMOPLASTIC ELASTOMER COMPOSITION, FOAM PARTICLE, AND FOAM MOLDED BODY

(71) Applicant: SEKISUI PLASTICS CO., LTD., Osaka (JP)

(72) Inventors: Yuichi Gondoh, Osaka (JP); Hirotaka Kondo, Osaka (JP); Masashi Yamashita, Osaka (JP); Masayuki Takano, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 373 days.

(21) Appl. No.: 16/645,556

(22) PCT Filed: Sep. 10, 2018

(86) PCT No.: PCT/JP2018/033454
§ 371 (c)(1),
(2) Date: Mar. 9, 2020

(87) PCT Pub. No.: WO2019/050032
PCT Pub. Date: Mar. 14, 2019

(65) Prior Publication Data
US 2020/0369862 A1    Nov. 26, 2020

(30) Foreign Application Priority Data

Sep. 11, 2017  (JP) .............................. JP2017-173948
Sep. 11, 2017  (JP) .............................. JP2017-173952

(51) Int. Cl.
| | | |
|---|---|---|
| C08L 23/16 | (2006.01) | |
| C08K 3/013 | (2018.01) | |
| C08J 9/18 | (2006.01) | |
| C08K 5/00 | (2006.01) | |
| C08L 33/24 | (2006.01) | |
| C08L 35/02 | (2006.01) | |

(52) U.S. Cl.
CPC ............ C08L 23/16 (2013.01); C08J 9/18 (2013.01); C08K 3/013 (2018.01); C08K 5/0041 (2013.01); C08L 33/24 (2013.01); C08L 35/02 (2013.01); *C08J 2300/22* (2013.01); *C08J 2300/26* (2013.01)

(58) Field of Classification Search
CPC .......... C08L 23/16; C08L 33/24; C08L 35/02; C08L 21/00; C08J 9/18; C08J 2300/22; C08J 2300/26; C08J 2353/00; C08J 9/0028; C08J 9/0052; C08J 2201/03; C08J 2203/14; C08J 9/0066; C08J 9/141; C08J 2205/044; C08J 2367/02; C08J 2371/02; C08J 2377/00; C08J 9/232; C08K 3/013; C08K 5/0041; C08K 13/02
See application file for complete search history.

(56) References Cited

U.S. PATENT DOCUMENTS

| | | | |
|---|---|---|---|
| 5,026,736 A † | 6/1991 | Pontiff | |
| 6,448,300 B1 † | 9/2002 | Maletzko | |
| 6,720,377 B2 | 4/2004 | Takimoto et al. | |
| 8,268,902 B2 † | 9/2012 | Casalini | |
| 8,535,585 B2 † | 9/2013 | Casalini | |
| 2003/0040556 A1 | 2/2003 | Takimoto et al. | |
| 2004/0033367 A1 | 2/2004 | Shimada et al. | |
| 2005/0049322 A1 | 3/2005 | Kanada et al. | |
| 2010/0016458 A1 | 1/2010 | Saitou et al. | |
| 2012/0065285 A1 † | 3/2012 | Braun | |
| 2014/0097389 A1 | 4/2014 | Chiba et al. | |
| 2014/0259329 A1* | 9/2014 | Watkins | B29C 44/0461 264/492 |
| 2014/0335031 A1 † | 11/2014 | Malet | |
| 2014/0353867 A1 | 12/2014 | Liu | |
| 2015/0174808 A1 † | 6/2015 | Rudolph | |
| 2016/0121524 A1* | 5/2016 | Däschlein | B29B 9/12 264/54 |
| 2016/0297943 A1* | 10/2016 | Däschlein | B29C 44/3461 |
| 2017/0246765 A1 | 8/2017 | Huang et al. | |
| 2017/0283555 A1 | 10/2017 | Takano et al. | |
| 2018/0051171 A1 | 2/2018 | Prissok et al. | |
| 2019/0153189 A1 | 5/2019 | Hayashi et al. | |
| 2019/0203009 A1 | 7/2019 | Keppeler et al. | |
| 2019/0256680 A1 | 8/2019 | Takagi et al. | |
| 2020/0046067 A1 | 2/2020 | Yamade | |
| 2020/0164560 A1 † | 5/2020 | Chen | |

FOREIGN PATENT DOCUMENTS

| | | |
|---|---|---|
| CN | 104890209 | 9/2015 |
| CN | 105968403 † | 9/2016 |
| EP | 2 799 472 | 11/2014 |
| EP | 3 202 833 | 8/2017 |
| EP | 3 578 068 | 12/2019 |
| JP | 2000-256470 | 9/2000 |

(Continued)

OTHER PUBLICATIONS

Office Action dated Sep. 24, 2021 in corresponding Chinese Patent Application No. 201880058776.5, with English machine translation.
International Search Report dated Dec. 11, 2018 in International (PCT) Application No. PCT/JP2018/033454.
Notice of Reasons for Refusal in corresponding Japanese Application No. 2017-173948, with English translation.
Notice of Reasons for Refusal in corresponding Japanese Application No. 2017-173952, with English translation.
Notice of Reasons for Refusal dated Dec. 8, 2020 in corresponding Japanese Patent Application No. 2019-224210 with English-language translation.

(Continued)

*Primary Examiner* — Kara B Boyle
(74) *Attorney, Agent, or Firm* — Wenderoth, Lind & Ponack, L.L.P.

(57) ABSTRACT

The thermoplastic elastomer composition contains a thermoplastic elastomer and a pigment.

2 Claims, 1 Drawing Sheet (56) References Cited

FOREIGN PATENT DOCUMENTS

| | | | |
|---|---|---|---|
| JP | 2001-294671 | | 10/2001 |
| JP | 2002-19033 | | 1/2002 |
| JP | 2004-75777 | | 3/2004 |
| JP | 2005-23302 | | 1/2005 |
| JP | 2006-232939 | | 9/2006 |
| JP | 2016-512850 | | 5/2016 |
| JP | 2018-44042 | | 3/2018 |
| JP | 2018-76464 | | 5/2018 |
| JP | 2018-172643 | | 11/2018 |
| KR | 2010062643 A | * | 6/2010 |
| WO | 94/20568 | | 9/1994 |
| WO | 1994020568 | † | 9/1994 |
| WO | 2009/037905 | | 3/2009 |
| WO | 2014/150122 A2 | | 9/2014 |
| WO | 2014/150122 A3 | | 9/2014 |
| WO | 2015/062868 | | 5/2015 |
| WO | 2015062868 | † | 5/2015 |
| WO | 2016/052387 | | 4/2016 |
| WO | 2016/146395 | | 9/2016 |
| WO | 2016146395 | † | 9/2016 |
| WO | 2017/094131 | | 6/2017 |
| WO | 2017094131 | † | 6/2017 |
| WO | 2017/220671 | | 12/2017 |
| WO | 2017220671 | † | 12/2017 |
| WO | 2018/142467 | | 8/2018 |
| WO | 2018/143281 | | 8/2018 |
| WO | 2018142467 | † | 8/2018 |
| WO | 2018143281 | † | 8/2018 |

OTHER PUBLICATIONS

Extended European Search Report dated Apr. 1, 2021, in corresponding European Patent Application No. 18854127.0.

\* cited by examiner
† cited by third party

THERMOPLASTIC ELASTOMER COMPOSITION, FOAM PARTICLE, AND FOAM MOLDED BODY

TECHNICAL FIELD

The present invention relates to a thermoplastic elastomer composition, expanded particles, and an expanded molded article.

BACKGROUND ART

Polystyrene expanded molded articles obtained by using polystyrene as a base resin have been conventionally widely used as a cushioning material and packaging material. An expanded molded article is obtained by heating expandable particles, such as expandable polystyrene particles, to allow the particles to expand (pre-expansion) to obtain expanded particles, and introducing the obtained expanded particles into the cavity of a mold, followed by secondary expansion to allow them to fuse and unify with each other through heat fusion.

Polystyrene expanded molded articles are known to have low resilience while having high rigidity, since the monomer used as its raw material is styrene. Therefore, they have disadvantages in use where repeated compression or flexibility is required.

For improved resilience of expanded molded articles, Patent Literature (PTL) 1 proposes an expanded molded article obtained by using a thermoplastic elastomer as a base resin. Further, PTL 2 proposes an expanded molded article obtained by using an amide-based elastomer, which is one type of thermoplastic elastomer, as a base resin. Thermoplastic elastomers represented by amide-based elastomers have elasticity higher than that of polystyrene. Therefore, it is believed to be possible to improve the resilience of an expanded molded article obtained by using a thermoplastic elastomer as a base resin.

PTL 1 also discloses that the use of expanded particles that are colored with a dye enables the production of an expanded molded article with a desired color.

CITATION LIST

Patent Literature

PTL 1: JP2016-512850A
PTL 2: WO2016/052387

SUMMARY OF INVENTION

Technical Problem

In PTL 1, an expanded molded article with excellent resilience can be obtained. In addition to resilience, however, expanded molded articles are also expected to have improved heat resistance. Thermoplastic elastomers, in particular, which have a hard segment and a soft segment, exhibit heat resistance lower than that of existing thermoplastic resin.

The present inventors produced an expanded molded article colored with a dye by using a thermoplastic elastomer as a base resin. Although the obtained expanded molded article had a uniform color, the color was pale, and imparting a dark color was difficult. Increasing the amount of dye will presumably darken the color, but it will also adversely affect the physical properties of molded articles. Therefore, there has been a demand for providing an expanded molded article with a darker color using a thermoplastic elastomer, without adversely affecting the physical properties.

A primary object of the present invention is to provide a thermoplastic elastomer composition, expanded particles, and an expanded molded article, each exhibiting improved heat resistance.

A second object of the present invention is to provide expanded particles and an expanded molded article, each having a dark color and excellent design.

Solution to Problem

The present inventors attempted to add various heat resistance improvers to improve the heat resistance of expanded molded articles produced using a thermoplastic elastomer. As a result, it was surprisingly found that a pigment can increase the crystallization temperature of thermoplastic elastomers, and that an expanded molded article produced using a thermoplastic elastomer composition comprising a thermoplastic elastomer and a pigment can have improved heat resistance.

Further, the present inventors attempted to add a pigment to obtain a darker-colored expanded molded article produced using a thermoplastic elastomer. The results revealed that a pigment can impart a dark color to expanded molded articles. Furthermore, it was surprisingly found that the use of a pigment can impart a characteristic color to expanded molded articles, and can consequently provide an expanded molded article with an excellent design.

Item 1. A thermoplastic elastomer composition comprising a thermoplastic elastomer and a pigment.

Item 2. The thermoplastic elastomer composition according to Item 1, wherein the pigment is present in an amount of 0.05 to 3.0 parts by mass, per 100 parts by mass of the thermoplastic elastomer.

Item 3. The thermoplastic elastomer composition according to Item 1 or 2, wherein the thermoplastic elastomer has crystallinity and is selected from the group consisting of an amide-based elastomer, an olefin-based elastomer, an ester-based elastomer, and a urethane-based elastomer.

Item 4. The thermoplastic elastomer composition according to any one of Items 1 to 3, wherein the thermoplastic elastomer is an amide-based elastomer, and the thermoplastic elastomer composition has a melting point 20 to 30° C. higher than the crystallization temperature.

Item 5. The thermoplastic elastomer composition according to any one of Items 1 to 3, wherein the thermoplastic elastomer is an olefin-based elastomer, and the thermoplastic elastomer composition has a melting point 30 to 45° C. higher than the crystallization temperature.

Item 6. The thermoplastic elastomer composition according to any one of Items 1 to 3, wherein the thermoplastic elastomer is an ester-based elastomer, and the thermoplastic elastomer composition has a melting point 25 to 45° C. higher than the crystallization temperature.

Item 7. Expanded particles of resin particles comprising the thermoplastic elastomer composition of any one of Items 1 to 6 expanded with a blowing agent.

Item 8. The expanded particles according to Item 7, wherein the expanded particles are colored expanded particles having dark and light color areas on a surface, and wherein the colored expanded particles exhibit dark and light colors that satisfy the following Characteristic (1) when the surface is measured with a color difference meter:

Characteristic (1): X-Y≥0.5, wherein X is a value of color difference at a dark color portion of the colored expanded particles, and Y is a value of color difference at a light color portion of the colored expanded particles.

Item 9. The expanded particles according to Item 7 or 8, wherein the expanded particles have a bulk density of 0.05 to 0.5 g/cm$^3$.

Item 10. The expanded particles according to Item 7, wherein the expanded particles have a bulk density of 0.05 to 0.5 g/cm$^3$, an open cell percentage of 10% or less, and an average particle diameter of 1 to 10 mm.

Item 11. The expanded particles according to any one of Items 7 to 10, wherein the pigment is present in an amount of 0.05 to 3.0 parts by mass, per 100 parts by mass of the thermoplastic elastomer, wherein the expanded particles contain a plurality of cells satisfying a relationship of A>B, wherein A represents an average cell diameter at a surface layer part and B represents an average cell diameter at a central part, and wherein the surface layer part has an average cell diameter of 100 to 400 µm, and the central part has an average cell diameter of 10 to 200 µm.

Item 12. The expanded particles according to Item 11, wherein the A and the B satisfy a relationship of A/B>1.5.

Item 13. An expanded molded article comprising the thermoplastic elastomer composition of any one of Items 1 to 6.

Item 14. An expanded molded article comprising a fusion of a plurality of the expanded particles of any one of Items 7 to 12.

Item 15. The expanded molded article according to Item 13 or 14, for use as a building material, a shoe part, or a cushioning material.

Advantageous Effects of Invention

The present invention can provide a thermoplastic elastomer composition, expanded particles, and an expanded molded article, each exhibiting excellent heat resistance. The present invention can also provide colored expanded particles and a colored expanded molded article, each having a dark color and an excellent design.

DESCRIPTION OF EMBODIMENTS

1. Thermoplastic Elastomer Composition

The thermoplastic elastomer composition (hereinafter also simply referred to as "the composition") comprises a thermoplastic elastomer and a pigment. The composition is suitably used for producing expanded particles and expanded molded articles. The pigment plays a role as a heat resistance improver in the composition. Specifically, as confirmed in the Examples, the pigment plays a role in increasing the crystallization temperature of thermoplastic elastomer. As the crystallization temperature increases, the crystallinity of thermoplastic elastomer improves; consequently, the heat-resistance of expanded molded articles improves. The present inventors etc. believe that the phenomenon in which a pigment improves the heat resistance of thermoplastic elastomer was not known in the technical field in which a thermoplastic elastomer is used to produce expanded molded articles.

(1) Thermoplastic Elastomer

A thermoplastic elastomer refers to a polymer having a soft segment, which is a flexible component exhibiting rubber elasticity, and a hard segment, which is a molecular-constraining component serving as a crosslinking point; thus exhibiting rubber elasticity at 25° C., while showing flowability when heated.

The thermoplastic elastomer can be selected from the group consisting of an amide-based elastomer, an olefin-based elastomer, an ester-based elastomer, and a urethane-based elastomer. In the composition, these elastomers may be present singly or in a combination of two or more. The thermoplastic elastomer preferably has crystallinity. The presence or absence of crystallinity can be determined by the presence or absence of crystallization temperature. The crystallization temperature can be measured with a differential scanning calorimeter.

(i) Amide-Based Elastomer

The amide-based elastomer may be crosslinked or non-crosslinked. In this specification, the term "non-crosslinked" means that the gel fraction of expanded particles insoluble in an alcohol solvent is 3.0 mass % or less, while the term "crosslinked" means that this gel fraction is more than 3.0 mass %.

In this specification, the gel fraction of amide-based elastomer (expanded article) is measured as follows. The mass W1 of the expanded article is measured. Next, the expanded article is immersed in 100 mL of an alcohol solvent (e.g., 3-methoxy-3-methyl-1-butanol) at 130° C. for over 24 hours.

Next, the residue in the alcohol solvent is filtered through an 80-wire mesh, the residue remaining on the wire mesh is dried at 130° C. for 1 hour, and the mass W2 of the residue remaining on the wire mesh is measured. Then, the gel fraction of the expanded article is calculated by the following equation.

$$\text{Gel fraction (mass \%)} = W2/W1 \times 100$$

The base resin constituting the thermoplastic elastomer composition preferably comprises a non-crosslinked amide-based elastomer from the viewpoints of low density, excellent processability, rebound resilience, and restoration characteristics.

For the non-crosslinked amide-based elastomer, a copolymer comprising a polyamide block (hard segment) and a polyether block (soft segment) can be used.

Examples of the polyamide blocks of polyamides include units comprising poly-ε-capramide (nylon 6), polytetramethylene adipamide (nylon 46), polyhexamethylene adipamide (nylon 66), polyhexamethylene sebacamide (nylon 610), polyhexamethylene dodecanamide (nylon 612), polyundecamethylene adipamide (nylon 116), polyundecanamide (nylon 11), polylauramide (nylon 12), polyhexamethylene isophthalamide (nylon 61), polyhexamethylene terephthalamide (nylon 6T), polynonamethylene terephthalamide (nylon 9T), polymetaxylylene adipamide (nylon MXD6), and the like. The polyamide block may be a unit comprising a combination of these polyamide structures.

Examples of polyether blocks of polyethers include units of polyethylene glycol (PEG), polypropylene glycol (PPG), polytetramethylene glycol (PTMG), polytetrahydrofuran (PTHF), and the like. The polyether block may be a unit comprising a combination of these polyether structures.

The polyamide blocks and the polyether blocks may be randomly distributed.

The polyamide block has a number average molecular weight of preferably 300 to 15000, and more preferably 600 to 5000. The polyether block has a number average molecular weight Mn of preferably 100 to 6000, and more preferably 200 to 3000.

For the non-crosslinked amide-based elastomer, the amide-based elastomers disclosed in U.S. Pat. Nos. 4,331,786, 4,115,475, 4,195,015, 4,839,441, 4,864,014, 4,230,838, and 4,332,920 may also be used.

The non-crosslinked amide-based elastomer is preferably obtained by copolycondensation of a polyamide block having reactive ends with a polyether block having reactive ends.

Examples of the copolycondensation in particular include the following:
(a) copolycondensation of a polyamide block having diamine chain ends with a polyoxyalkylene block having dicarboxylic ends;
(b) copolycondensation of a polyamide block having dicarboxylic ends with a polyoxyalkylene block having diamine chain ends obtained by cyanoethylation and hydrogenation of an aliphatic dihydroxylated α, ω-polyoxyalkylene block called polyether diol; and
(c) copolycondensation of a polyamide block having dicarboxylic ends with polyether diol (the one obtained here is called, in particular, polyetheresteramide).

Examples of compounds that give a polyamide block having dicarboxylic ends include a compound obtained by condensation of a dicarboxylic acid and a diamine in the presence of a chain regulating agent of α, ω-aminocarboxylic acid, lactam, or dicarboxylic acid. In copolycondensation (a), the non-crosslinked amide-based elastomer can be obtained, for example, by reacting a polyether diol, a lactam (or α, ω-amino acid), and a diacid as a chain-limiting agent in the presence of a small amount of water. The non-crosslinked amide-based elastomer may contain polyether blocks and polyamide blocks of various lengths. Further, each component may be randomly reacted, and so randomly distributed within a polymer chain.

In the above copolycondensation, the polyether diol block can be used as is; or the hydroxyl groups thereof and the polyamide block having carboxyl end groups may be copolymerized before use; or the hydroxyl groups thereof may be aminated to convert it to polyether diamine, which may then be condensed with a polyamide block having carboxyl end groups, before use. It is also possible to obtain a polymer having randomly distributed polyamide blocks and polyether blocks by mixing polyether diol blocks, polyamide precursors, and a chain-limiting agent to subject the mixture to copolycondensation.

(ii) Olefin-Based Elastomer

The olefin-based elastomer may be crosslinked or non-crosslinked. The term "non-crosslinked" means that the gel fraction of expanded article insoluble in xylene is 3.0 mass % or less, while the term "crosslinked" means that this gel fraction is more than 3.0 mass %.

In this specification, the gel fraction of olefin-based elastomer (expanded article) is measured as follows. The mass $W1$ of the expanded article is measured. Next, the expanded article is heated at reflux for 3 hours in 80 ml of boiling xylene. Next, the residue in the xylene is filtered through an 80-wire mesh, the residue remaining on the wire mesh is dried at 130° C. for 1 hour, and the mass $W2$ of the residue remaining on the wire mesh is measured. Then, the gel fraction of the expanded article is calculated by the following equation.

$$\text{Gel fraction (mass \%)} = W2/W1 \times 100$$

The base resin constituting the theimoplastic elastomer composition preferably comprises a non-crosslinked olefin-based elastomer from the viewpoints of low density, excellent processability, rebound resilience, and restoration characteristics.

The non-crosslinked olefin-based elastomer is preferably one that can impart a predetermined density and compression set to expanded articles in the absence of mineral oil. Examples of non-crosslinked olefin-based elastomers include those having a combined structure of a hard segment and a soft segment. Such a structure imparts properties, i.e., showing rubber elasticity at room temperature, and being plasticized to be moldable at a high temperature.

Examples include a non-crosslinked olefin-based elastomer in which the hard segment is polypropylene-based resin and the soft segment is polyethylene-based resin.

For the former polypropylene-based resin, a resin mainly comprising polypropylene can be used. The polypropylene may be those having a stereoregularity selected from isotacticity, syndiotacticity, atacticity, and the like.

For the latter polyethylene-based resin, a resin mainly comprising polyethylene can be used. Examples of the components other than polyethylene include polyolefins, such as polypropylene and polybutene.

The non-crosslinked olefin-based elastomer may contain a softening agent such as lubricating oil, paraffin, coconut oil, stearic acid, and fatty acid. Examples of the non-crosslinked olefin-based elastomer include elastomers of polymerization type directly produced in a polymerization reactor by polymerization of monomers for the hard segment and monomers for the soft segment; and elastomers of blending type produced by physically dispersing polypropylene-based resin for the hard segment and polyethylene-based resin for the soft segment using a kneader, such as a Banbury mixer or a twin-screw extruder.

The non-crosslinked olefin-based elastomer preferably has a Shore A hardness of 30 to 100, and more preferably 40 to 90. The hardness of the non-crosslinked olefin-based elastomer is measured according to the durometer hardness test (JIS K6253:97). The non-crosslinked olefin-based elastomer preferably has a Shore D hardness of 10 to 70, and more preferably 20 to 60. The hardness of the non-crosslinked olefin-based elastomer is measured according to the durometer hardness test (ASTM D2240:95).

(iii) Ester-Based Elastomer

Examples of ester-based elastomers include those containing a hard segment and a soft segment.

The hard segment is composed of, for example, a dicarboxylic acid component and/or a diol component. The hard segment may also be composed of two components, i.e., a dicarboxylic acid component and a diol component.

Examples of the dicarboxylic acid component include components from aliphatic dicarboxylic acids, such as oxalic acid, malonic acid, and succinic acid, and derivatives thereof; and components from aromatic dicarboxylic acids, such as terephthalic acid, isophthalic acid, and naphthalenedicarboxylic acid, and derivatives thereof.

Examples of the diol component include C2-10 alkylene glycols, such as ethylene glycol, propylene glycol, and butanediol (e.g., 1,4-butanediol); (poly)oxy C2-10 alkylene glycol; C5-12 cycloalkanediol, bisphenols, and alkylene oxide adducts thereof; and the like. The hard segment may have crystallinity.

The soft segment may be a segment of polyester type and/or polyether type.

Examples of the soft segment of polyester type include aliphatic polyesters, such as polycondensates of dicarboxylic acids (aliphatic C4-12 dicarboxylic acid, such as adipic acid) with diols (C2-10 alkylene glycol, such as 1,4-butanediol, and (poly)oxy C2-10 alkylene glycol, such as ethylene glycol), polycondensates of oxycarboxylic acids, and ring-opening polymers of lactones (C3-12 lactones, such as ε-caprolactone). The soft segment of polyester type may be amorphous. Specific examples of polyesters as the soft segment include caprolactone polymers; and polyesters of C2-6 alkylene glycol and C6-12 alkanedicarboxylic acid, such as polyethylene adipates and polybutylene adipates. The polyester may have a number average molecular weight of 200 to 15000, 200 to 10000, or 300 to 8000.

Examples of the soft segment of polyether type include segments from aliphatic polyethers, such as polyalkylene glycol (e.g., polyoxyethylene glycol, polyoxypropylene glycol, and polyoxytetramethylene glycol). The polyether may have a number average molecular weight of 200 to 10000, 200 to 6000, or 300 to 5000.

The soft segment may be a segment from polyesters containing polyether units, such as copolymers of aliphatic polyesters and polyethers (polyether-polyester), or from polyesters of polyethers and aliphatic dicarboxylic acids, such as polyoxyalkylene glycols (e.g., polyoxytetramethylene glycol).

The mass ratio of the hard segment to the soft segment may be 20:80 to 90:10, 30:70 to 90:10, 30:70 to 80:20, 40:60 to 80:20, or 40:60 to 75:25.

When the dicarboxylic acid component is a terephthalic acid component and a dicarboxylic acid component other than the terephthalic acid component, the ester-based elastomer may contain 30 to 80 mass % of the hard segment, and 5 to 30 mass % of the dicarboxylic acid component other than the terephthalic acid component. The content of the dicarboxylic acid component other than the terephthalic acid component may be 5 to 25 mass %, 5 to 20 mass %, or 10 to 20 mass %. The content of the dicarboxylic acid component can be determined by quantitatively evaluating the NMR spectrum of the resin. The dicarboxylic acid component other than the terephthalic acid component is preferably an isophthalic acid component. The presence of an isophthalic acid component contributes to the tendency of decreasing the crystallinity of the elastomer and improves expansion moldability, thus making it possible to obtain an expanded molded article with lower density.

(iv) Urethane-Based Elastomer

Examples of polyurethane-based elastomers include elastomers containing urethane bonds in the molecules obtained by a polyaddition reaction using long-chain polyols, short-chain glycols, diisocyanates, etc., as raw materials. Examples of long-chain polyols include poly(ethylene adipate), poly(diethylene adipate), poly(1,4-butylene adipate), poly(1,6-hexane adipate), polylactone diol, polycaprolactone diol, polyenantlactone diol, polyethylene glycol, polypropylene glycol, polytetramethylene glycol, poly(propylene glycol/ethylene glycol), poly(1,6-hexamethylene glycol carbonate), and the like. The molecular weight of the long-chain polyol may be 100 to 10000 or 500 to 5000.

Examples of short-chain glycols include ethylene glycol, 1,2-propylene glycol, 1,3-propylene glycol, 1,2-butanediol, 1,3-butanediol, 1,4-butanediol, 2,3-butanediol, 2,4-butanediol, 1,5-pentanediol, 1,6-hexanediol, 1,4-xylylene glycol, bisphenol hydroquinone diethylol ether, phenylene bis-(β-hydroxyethyl ether), and the like. Examples of diisocyanates includes 2,4-tolylene diisocyanate, 2,6-tolylene diisocyanate, phenylene diisocyanate, 4,4'-diphenylmethane diisocyanate, 4,4'-diphenyl diisocyanate, 1,5-naphthalene diisocyanate, 3,3'-dimethyl biphenyl-4,4'-diisocyanate, o-xylene diisocyanate, m-xylene diisocyanate, p-xylene diisocyanate, tetramethylene diisocyanate, hexamethylene diisocyanate, trimethylhexamethylene diisocyanate, dodecamethylene diisocyanate, cyclohexane diisocyanate, dicyclohexylmethane diisocyanate, isophorone diisocyanate, and the like.

The polyurethane-based elastomer may comprise a soft segment composed of a long-chain polyol and diisocyanate, and a hard segment composed of a short-chain glycol and diisocyanate. The polyurethane-based elastomer is optionally subjected to modification treatment, such as maleation, carboxylation, hydroxylation, epoxidation, halogenation, or sulfonation; or may be subjected to crosslinking treatment, such as sulfur crosslinking, peroxide crosslinking, metal ion crosslinking, electron beam crosslinking, or silane crosslinking.

The polyurethane-based elastomer may have a viscosity molecular weight of 5000 to 300000, or 10000 to 100000, from the viewpoint of toughness and flexibility as a molded article. The polyurethane-based elastomer may have a number average molecular weight of 3000 to 200000, 5000 to 180000, or 8000 to 150000.

(2) Pigment

The pigment as a heat resistance improver is not particularly limited, as long as it can improve the heat resistance of expanded molded articles. Here, the pigment can have a function capable of increasing the crystallization temperature of the thermoplastic elastomer composition to be 10° C. or more higher than the crystallization temperature of the thermoplastic elastomer. The pigment also has a usual function as a pigment of imparting a color to allow expanded particles and expanded molded articles to have a desired color.

Examples of the pigment include carbon-based pigment, titanium oxide-based pigment, iron oxide-based pigment, iron hydroxide-based pigment, chromium oxide-based pigment, spinel-based pigment, lead chromate-based pigment, chromate vermilion pigment, Prussian blue-based pigment, aluminum powder, bronze powder, calcium carbonate-based pigment, barium sulfate-based pigment, silicon oxide-based pigment, aluminum hydroxide-based pigment, phthalocyanine-based pigment, azo-based pigment, condensed azo-based pigment, anthraquinone-based pigment, azine-based pigment, quinoline-based pigment, quinacridone-based pigment, perinone-perylene based pigment, indigo-thioindigo-based pigment, isoindolinone-based pigment, azomethineazo-based pigment, dioxazine-based pigment, quinacridone-based pigment, aniline black-based pigment, triphenylmethane-based pigment, and the like. These pigments may be used singly or in a combination of two or more.

Examples of the carbon-based pigment include carbon black, channel black, furnace black, acetylene black, anthracene black, oil smoke, pine smoke, graphite, and the like. Examples of other pigments include copper phthalocyanine, isoindoline, dichloroquinacridone, diketopyrrolopyrrole, C.I. pigment red 2, C.I. pigment red 3, C.I. pigment red 5, C.I. pigment red 17, C.I. pigment red 22, C.I. pigment red 38, C.I. pigment red 41, C.I. pigment red 48:1, C.I. pigment red 48:2, C.I. pigment red 48:3, C.I. pigment red 48:4, C.I. pigment red 49, C.I. pigment red 50:1, C.I. pigment red 53:1, C.I. pigment red 57:1, C.I. pigment red 58:2, C.I. pigment red 60, C.I. pigment red 63:1, C.I. pigment red 63:2, C.I. pigment red 64:1, C.I. pigment red 88, C.I. pigment red 112, C.I. pigment red 122, C.I. pigment red 123, C.I. pigment red 144, C.I. pigment red 146, C.I. pigment red 149, C.I. pigment red 166, C.I. pigment red 168, C.I. pigment red 170, C.I. pigment red 176, C.I. pigment red 177, C.I. pigment red 178, C.I. pigment red 179, C.I. pigment red 180, C.I. pigment red 185, C.I. pigment red 190, C.I. pigment red 194, C.I. pigment red 202, C.I. pigment red 206, C.I. pigment red 207, C.I. pigment red 209, C.I. pigment red 216, C.I. pigment red 245, C.I. pigment violet 19, C.I. pigment blue 2, C.I. pigment blue 15, C.I. pigment blue 15:1, C.I. pigment blue 15:2, C.I. pigment blue 15:3, C.I. pigment blue 15:4, C.I. pigment blue 15:5, C.I. pigment blue 16, C.I. pigment blue 17, C.I. pigment blue 22, C.I. pigment blue 25, C.I. pigment blue 28, C.I. pigment blue 60, C.I. pigment blue 66, C.I. pigment green 7, C.I. pigment green 10, C.I. pigment green 26, C.I. pigment green 36, C.I. pigment green 50, C.I. pigment yellow 1, C.I. pigment yellow 3, C.I. pigment yellow 11, C.I. pigment yellow 12, C.I. pigment yellow 13, C.I. pigment yellow 14, C.I. pigment yellow 17, C.I. pigment yellow 21, C.I. pigment yellow 35, C.I. pigment yellow 53, C.I. pigment yellow 55, C.I. pigment yellow 74, C.I. pigment yellow 76, C.I. pigment yellow 82, C.I. pigment yellow 83, C.I. pigment yellow 102, C.I. pigment yellow 110, C.I. pigment yellow 128, C.I. pigment yellow 153, C.I. pigment yellow 157, C.I. pigment yellow 161, C.I. pigment yellow 167, C.I. pigment yellow 173, C.I. pigment yellow 184, and the like.

In one embodiment, the pigment is preferably an inorganic pigment, preferably a carbon-based pigment, and more preferably carbon black, in order to impart a dark color.

(3) Amounts of Pigment and Thermoplastic Elastomer

The pigment is preferably present in an amount of 0.05 to 3.0 parts by mass per 100 parts by mass of the thermoplastic elastomer. When the amount is 0.05 parts by mass or more, the heat resistance can be sufficiently improved. The amount of the pigment is preferably 0.05 parts by mass or more per 100 parts by mass of the thermoplastic elastomer to also sufficiently impart a color to the thermoplastic elastomer. When the amount is 3.0 parts by mass or less, expansion is not inhibited. The pigment is more preferably contained in an amount of 0.1 to 2.0 parts by mass, and still more preferably 0.2 to 1.0 parts by mass.

(4) Additives

The base resin that constitutes the thermoplastic elastomer composition may comprise additives and other resins, such as amide-based resin (excluding elastomers), olefin-based resin (excluding elastomers), ester-based resin (excluding elastomers), urethane-based resin (excluding elastomers), and polyether resin, to an extent that the effects of the present invention are not impaired. The other resins may also be known thermoplastic resin or thermosetting resin.

(5) Crystallization Temperature and Melting Point of Thermoplastic Elastomer Composition When the thermoplastic elastomer is an amide-based elastomer, the thermoplastic elastomer composition preferably has a melting point 20 to 30° C. higher than the crystallization temperature, and more preferably 20 to 25° C. higher than the crystallization temperature, from the viewpoint of improving heat resistance.

When the thermoplastic elastomer is an olefin-based elastomer, the thermoplastic elastomer composition preferably has a melting point 30 to 45° C. higher than the crystallization temperature, and more preferably 30 to 40° C. higher than the crystallization temperature, from the viewpoint of improving heat resistance.

When the thermoplastic elastomer is an ester-based elastomer, the thermoplastic elastomer composition preferably has a melting point 25 to 45° C. higher than the crystallization temperature, and more preferably 25 to 40° C. higher than the crystallization temperature, from the viewpoint of improving heat resistance.

When the composition has the above-mentioned relationship between the crystallization temperature and the melting point, it is possible to provide a composition capable of producing an expanded molded article with higher heat resistance.

2. Expanded Particles (1) Expanded Particles

The expanded particles are formed of a thermoplastic elastomer composition comprising a thermoplastic elastomer and a pigment as a heat resistance improver. The expanded particles, which comprise a pigment, have high heat resistance. The amounts of the thermoplastic elastomer and the pigment in the expanded particles are as stated above regarding the thermoplastic elastomer composition.

The expanded particles preferably have a bulk density of 0.05 to 0.5 g/cm$^3$ from the viewpoint of heat resistance. The bulk density is more preferably 0.05 to 0.25 g/cm$^3$.

The expanded particles preferably have an open cell percentage of 10% or less from the viewpoint of heat resistance. The open cell percentage is more preferably 5% or less. The lower limit is 0%.

The expanded particles preferably have an average particle diameter of 1 to 10 mm. The average particle diameter is more preferably 2 to 5 mm.

In one embodiment, the expanded particles are colored expanded particles having dark and light color areas on their surface. As described later, the colored expanded particles are used to produce a colored expanded molded article. The degree of dark and light colors of the colored expanded particles can be measured, for example, with a color difference meter. More specifically, when the surface of the colored expanded particles is measured with a color difference meter, the following Characteristic (1) is preferably satisfied, from the viewpoint of design based on dark and light colors.

Characteristic (1): X-Y≥0.5, wherein X is a value of color difference at a dark color portion of the colored expanded particles, and Y is a value of color difference at a light color portion of the colored expanded particles.

X-Y is more preferably 1 or more, further more preferably 3 or more, and particularly preferably 5 or more.

In one embodiment, the expanded particles contain a plurality of cells that satisfy a relationship of A>B (A represents an average cell diameter (μm) at a surface layer part of the expanded particles, and B represents an average cell diameter (μm) at a central part of the expanded particles). By having this relationship, it is possible to provide an expanded molded article with a darker color even with the use of a smaller amount of the pigment, compared to expanded particles having a relationship of A≤B. In this case, the pigment is preferably an inorganic pigment. The present inventors etc. presume that this is because the diffuse reflection of light can be reduced.

In this specification, the surface layer part refers to an area of about 30% of the radius of the expanded particle from the surface of the expanded particles toward the central part. The central part refers to an area of about 70% of the radius of the expanded particles from the central part of the expanded particles toward the surface.

The surface layer part preferably has an average cell diameter of 100 to 400 μm. In contrast, the central part preferably has an average cell diameter of 10 to 200 μm. From the viewpoint of sufficiently imparting a color, the surface layer part preferably has an average cell diameter of 100 μm or more. From the viewpoint of moldability, the surface layer part preferably has an average cell diameter of 400 μm or less. The central part preferably has an average cell diameter of 10 or more, from the viewpoint of shrinkage prevention. The central part preferably has an average cell diameter of 200 μm or less, from the viewpoint of fusion of expanded particles during molding.

Further, A and B preferably have a relationship of A/B>1.5. This relationship indicates that the cells located in the surface layer part of the expanded particles have a considerably larger average cell diameter than the cells located in the central part. By having this structure, it is possible to provide an expanded molded article that has a large color difference, as well as a dark color even with the use of a smaller amount of the pigment, compared to the case where A/B is 1.5 or less.

(2) Production Method for Expanded Particles

The expanded particles can be obtained by a step of impregnating resin particles with a blowing agent to obtain expandable particles (impregnation step), and an expansion step of expanding expandable particles.

(i) Impregnation Step (a) Resin Particles

The resin particles can be obtained by using known production methods and known production equipment. For example, resin particles can be produced by subjecting a melt-kneaded product of a resin and a pigment extruded from an extruder to granulation by underwater cutting, strand cutting, or the like. The thermoplastic elastomer composition described above can be used as a melt-kneaded product. The temperature, time, pressure, etc., during melt-kneading can be appropriately set according to the raw materials used and the production equipment.

The melt-kneading temperature in the extruder during melt-kneading is preferably a temperature at which the resin is sufficiently softened, i.e., 170 to 250° C., and more preferably 200 to 230° C. The melt-kneading temperature refers to the temperature of a melt-kneaded product inside an extruder, which is obtained by measuring the temperature at the center of the melt-kneaded product flow channel near the extruder head with a thermocouple thermometer.

The pigment can be supplied to the extruder in the form of a masterbatch. Examples of the resin constituting the masterbatch include polyolefin-based resin, such as polyethylene and polypropylene; and thermoplastic elastomer resin, such as amide-based elastomer, ester-based elastomer, olefin-based elastomer, and urethane-based elastomer. Among these, a thermoplastic elastomer resin is preferred.

Examples of the shape of the resin particles include truly spherical, elliptically spherical (oval), columnar, prismatic, pellet-like, and granular-like shapes.

The resin particles preferably have an average particle diameter of 0.5 to 3.5 mm. When the average particle diameter is less than 0.5 mm, the holding power of the blowing agent may be deteriorated, possibly reducing the expandability. When the average particle diameter is larger than 3.5 mm, the property of being filled in a mold may be deteriorated. In the resin particles, L/D is preferably 0.5 to 3, wherein L represents a length (mm) thereof, and D represents an average diameter (mm). When the L/D of the resin particles is less than 0.5 or more than 3, the property of being filled in a mold may be deteriorated. The length L of the resin particles refers to the length of a resin particle in the extrusion direction, and the average diameter D refers to the diameter of the cut surface of a resin particle substantially perpendicular to the direction of the length L. The average diameter D of the resin particles is preferably 0.5 to 3.5 mm. When the average diameter is less than 0.5 mm, the holding properties of the blowing agent may be deteriorated, possibly reducing the expandability of expandable particles. When it is larger than 3.5 mm, the property of the expanded particles, i.e., being filled in a mold, is deteriorated, and the thickness of the expanded article when produced in the form of a plate sometimes cannot be reduced.

The resin particles may comprise a cell adjusting agent. Examples of the cell adjusting agent include sodium bicarbonate-citric acid, higher fatty acid amides, higher fatty acid bisamides, higher fatty acid salts, inorganic cell nucleating agents, and the like. These cell adjusting agents may be used singly or in a combination of two or more.

Examples of higher fatty acid amides include stearic acid amide, 12-hydroxystearic acid amide, and the like.

Examples of higher fatty acid bisamides include ethylenebis stearamide, ethylenebis-12-hydroxystearamide, methylenebis stearamide, and the like.

Examples of higher fatty acid salts include calcium stearate.

Examples of inorganic cell nucleating agents include talc, calcium silicate, synthetic or naturally occurring silicon dioxide, and the like.

In addition to these, the resin particles may further comprise a flame retardant such as hexabromocyclododecane or triallyl isocyanurate hexabromide.

(b) Expandable Particles

Expandable particles are produced by impregnating resin particles with a blowing agent. The method for impregnating resin particles with a blowing agent may be a known method for impregnation. Examples include a method in which resin particles, a dispersant, and water are supplied to a hermetically sealable autoclave; and the mixture is stirred to disperse the resin particles in water to obtain a dispersion, to which a blowing agent is added under pressure to thus impregnate the blowing agent into the resin particles (wet impregnation). Alternatively, a method in which a blowing agent is impregnated without using water (dry impregnation method) may also be used.

Examples of dispersants include, but are not particularly limited to, poorly water-soluble inorganic substances, such as calcium phosphate, magnesium pyrophosphate, sodium pyrophosphate, magnesium oxide, and hydroxyapatite; and surfactants such as sodium dodecylbenzenesulfonate.

The blowing agent may be a general-purpose blowing agent. Examples include inorganic gases, such as air, nitrogen, and carbon dioxide (carbon dioxide gas); aliphatic hydrocarbons, such as propane, butane, and pentane; and halogenated hydrocarbons. Aliphatic hydrocarbons and inorganic gases are preferred. The blowing agents may be used singly or in a combination of two or more.

The amount of the blowing agent to be impregnated into the resin particles is preferably 1 to 12 parts by mass, per 100 parts by mass of the resin particles. From the viewpoint of expansion power, the amount of the blowing agent is preferably 1 part by mass or more. From the viewpoint of maintaining the strength of the cell membrane and the viscosity during expansion, the amount is preferably 12 parts by mass or less. When an aliphatic hydrocarbon is used as the blowing agent, the amount thereof is more preferably 6 to 8 parts by mass. Within this range, the expansion power can be sufficiently enhanced. Even when the expanding ratio is high, more excellent expansion is possible. When the amount of the blowing agent is 8 parts by mass or less, breakage of the cell membranes is suppressed, and the plasticizing effect is prevented from overly increasing. Thus, the excessive reduction in the viscosity during expansion is suppressed while contraction is suppressed.

The amount (impregnation amount) of the blowing agent impregnated into 100 parts by mass of the resin particles is measured as follows. The mass X g of the resin particles before being placed in a pressure vessel is measured. In the pressure vessel, the resin particles are impregnated with a blowing agent, and then the mass Y g of the impregnated material after being removed from the pressure vessel is measured. The amount (impregnation amount) of the blowing agent impregnated into 100 parts by mass of the resin particles is calculated by the following equation.

$$\text{Amount of blowing agent (parts by mass)} = ((Y-X)/X) \times 100$$

When an aliphatic hydrocarbon is used as the blowing agent, impregnation of the blowing agent into the resin particles at a low temperature requires a longer time, possibly decreasing the production efficiency. In contrast, if the temperature is high, the resin particles are fused to each other, possibly forming bonded particles. The impregnation temperature is preferably room temperature (25° C.) to 120° C., and more preferably 50 to 110° C. A blowing auxiliary agent (plasticizer) may also be used in combination with the blowing agent. Examples of the blowing auxiliary agent (plasticizer) include diisobutyl adipate, toluene, cyclohexane, ethylbenzene, and the like.

(ii) Expansion Step

In the expansion step, the expansion temperature and a heating medium are not particularly limited, as long as expanded particles are obtained by expanding expandable particles. Before expansion, an anti-fusing agent or an antistatic agent may be applied to the surface of the expandable particles. Examples of the anti-fusing agent include polyamide powder, surfactants, and the like. Examples of the antistatic agent include polyoxyethylene alkylphenol ether, stearic acid monoglyceride, and the like.

3. Expanded Molded Article

The expanded molded article is formed of a thermoplastic elastomer composition comprising a thermoplastic elastomer and a pigment as a heat resistance improver. The expanded molded article, which comprises a pigment, has a high heat resistance. The expanded molded article includes a fusion of a plurality of expanded particles. The thermoplastic elastomer, pigment, and their amounts in the expanded molded article are the same as those described above for the thermoplastic elastomer composition.

The expanded molded article preferably has a density of 0.05 to 0.25 g/cm³, from the viewpoint of heat resistance. The density is more preferably 0.10 to 0.20 g/cm³.

The expanded molded article can be used in a wide range of applications, such as various building materials, shoe parts (e.g., insole, midsole), sports goods, cushioning materials, seat cushions, and automotive parts.

Figure 1:
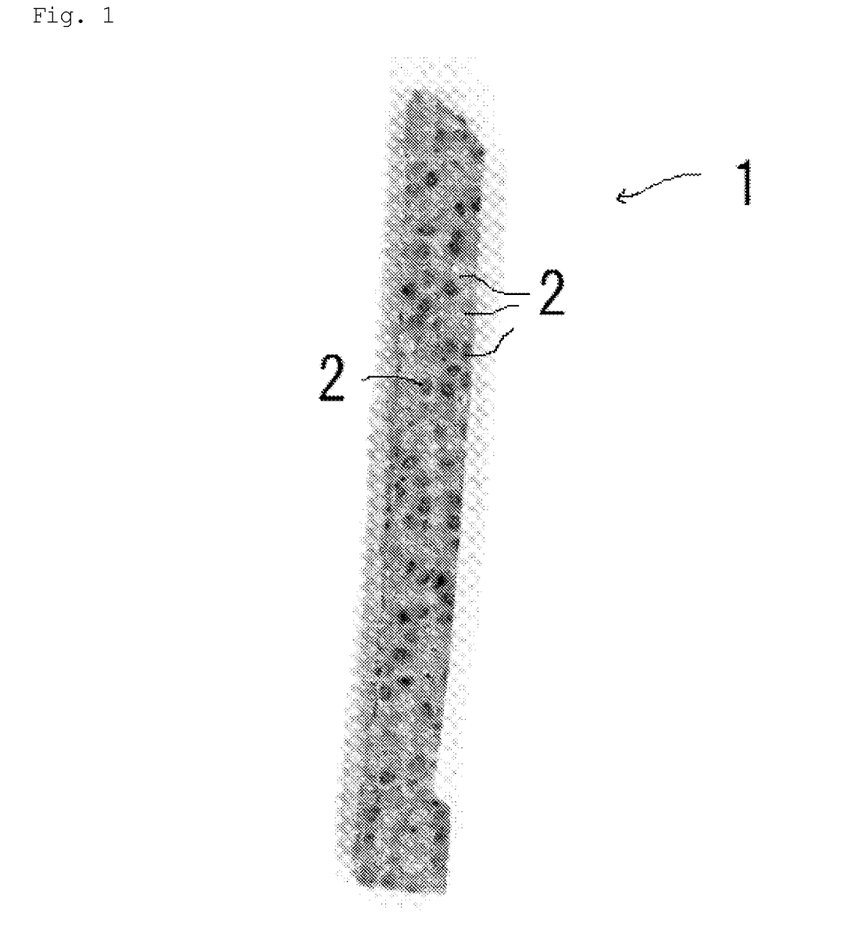
FIG. 1 is a photograph of a colored expanded molded article according to the present invention.

FIG. 1 shows an example of expanded molded article. The expanded molded article shown in FIG. 1 is a colored expanded molded article 1 composed of a fusion of a plurality of colored expanded particles 2. The individual fused, colored expanded particle 2 has dark and light color areas on the surface. Therefore, the fused, colored expanded particles 2 impart a unique color tone to the surface of the colored expanded molded article 1. Each colored expanded molded article 1 has its own randomly imparted dark and light colors on the surface. Therefore, for example, when the colored expanded molded article 1 is used as a shoe part, each shoe can have a different design from one another based on the dark and light colors. This can give an impression to consumers that the design is unique, and that no same design exists, thus stimulating the consumers' possessive instinct.

The expanded molded article can be produced by subjecting a pair of molds into which a plurality of expanded particles has been introduced to heat-molding with a heating medium. For example, the expanded molded article can be obtained by introducing expanded particles into a mold with many small pores; and heating the expanded particles to be expanded with pressurized water vapor so as to fill the gaps between the expanded particles, allowing the expanded particles to be fused to each other and unified.

The expanded particles may be impregnated with inert gas or air (hereinafter referred to as "an inert gas etc.") to enhance the expansion power of the expanded particles. By enhancing the expansion power, the expanded particles will fuse to each other in a more excellent manner, allowing the expanded article to exhibit better expandability. Examples of inert gas include carbon dioxide, nitrogen, helium, argon, and the like.

Examples of the method for impregnating an inert gas into the expanded particles include a method for impregnating an inert gas into the expanded particles by placing the expanded particles in an atmosphere of an inert gas at an atmospheric pressure or higher. The expanded particles may be impregnated with an inert gas before being introduced into a mold, or may be impregnated with an inert gas etc. by placing a mold in which the expanded particles have been introduced in an atmosphere of an inert gas etc. When the inert gas is nitrogen, it is preferable to leave the expanded particles to stand for 20 minutes to 24 hours in a nitrogen atmosphere at 0.1 to 2.0 MPa (gauge pressure).

EXAMPLES

Next, the present invention will be described in more detail below with reference to Examples. However, the present invention is not limited to these Examples.

Test Example 1

Melting Point and Crystallization Temperature of Thermoplastic Elastomer and Thermoplastic Elastomer Composition The measurements were performed in accordance with JIS K7121:1987, 2012 "Testing methods for transition temperatures of plastics"; and JIS K7122:1987, 2012 "Testing methods for heat of transitions of plastics." However, sampling was performed as follows, under the following temperature conditions. Here, a "DSC6220 ASD-2" differential scanning calorimeter, manufactured by SII NanoTechnology, Inc.; or a "DSC7000X AS-3" differential scanning calorimeter, manufactured by Hitachi High-Tech Science Corporation, was used. About 6 mg of sample was introduced into the aluminum measuring container so as to leave no space at the bottom. In a nitrogen flow at a rate of 20 mL/min, the sample was cooled from 30° C. to −70° C., maintained for 10 minutes, heated from −70° C. to 220° C. (1st heating), maintained for 10 minutes, cooled from 220° C. to −70° C. (cooling), maintained for 10 minutes, and heated from −70° C. to 220° C. (2nd heating), to thus obtain a DSC curve. All of the heating and cooling were performed at a rate of 10° C./min, and alumina was used as a reference substance. In the present invention, the melting point refers to the peak top temperature of the largest melting peak observed in the course of the 2nd heating, and this value was obtained from the analysis software provided with the device. The crystallization temperature refers to the peak top temperature of the crystallization peak at the highest temperature side with a calorific value of 3 mJ/mg or more observed during the course of cooling, and this value was obtained from the analysis software provided with the device.

Length L and Average Diameter D of Resin Particles

The length L (mm) and average diameter D (mm) of resin particles were measured using a caliper. The length L refers to a length of resin particle in the direction of extrusion during the production of resin particles, and the average diameter D refers to a length perpendicular to the extrusion direction.

Bulk Density of Expanded Particles

First, expanded particles were weighed (W g) as a measurement sample, and the measurement sample was allowed to freely fall in a measuring cylinder. Thereafter, the bottom of the measuring cylinder was tapped to obtain a constant apparent volume V ($cm^3$) of the sample, and the mass and volume thereof were measured. The bulk density of expanded particles was then calculated by the following equation.

$$\text{Bulk density (g/cm}^3\text{)=mass of measurement sample (W)/volume of measurement sample (V)}$$

Average Particle Diameter of Expanded Particles

About 50 g of expanded particles were classified for 5 minutes with JIS standard sieves having sieve openings of 16.00 mm, 13.20 mm, 11.20 mm, 9.50 mm, 8.00 mm, 6.70 mm, 5.60 mm, 4.75 mm, 4.00 mm, 3.35 mm, 2.80 mm, 2.36 mm, 2.00 mm, 1.70 mm, 1.40 mm, 1.18 mm, and 1.00 mm, using a Ro-Tap sieve shaker (manufactured by SIEVE FACTORY IIDA Co., Ltd.). The mass of the sample on the sieve net was measured; and, based on the cumulative mass distribution curve obtained from the results, the particle diameter (median diameter) at which the cumulative mass was 50% was defined as an average particle diameter.

Open Cell Percentage of Expanded Particles

First, a total mass A (g) of expanded particles in an amount that would fill about 80% of a sample cup of a volumetric air pycnometer was measured. Next, a volume B ($cm^3$) of the entire expanded particles was measured by a 1-1/2-1 atmospheric pressure method with an air pycnometer. For the air pycnometer, for example, a commercially available product (product name "Type-1000," manufactured by Tokyo Science Co., Ltd.) was used. Subsequently, a wire gauze container was immersed in water, and the mass C (g) of the wire gauze container in a state of being immersed in water was measured. Next, the entire expanded particles were placed in the wire gauze container, and the wire gauze container was immersed in water. Then, the mass D (g), which is the total mass of the wire gauze container and the entire expanded particles placed in the wire gauze container in a state of being immersed in water, was measured. Thereafter, the apparent volume E ($cm^3$) of the expanded particles was calculated by the following equation; and, based on the apparent volume E and the volume B ($cm^3$) of the entire expanded particles, the open cell percentage of the expanded particles was calculated by the following equation. In calculation of the open cell percentage, the volume of 1 g of water was 1 $cm^3$.

$$E=A+(C-D)$$

$$\text{Open cell percentage (\%)}=100\times(E-B)/E$$

Density of Expanded Molded Article

The density of expanded molded article was measured in accordance with the method described in JIS K 7222:2005 "Cellular plastics and rubbers—Determination of apparent (bulk) density." More specifically, a test sample (100 $cm^3$ or more) was obtained by cutting from a material so as not to change the original cell structure of the material, and the mass was measured. The density was calculated by the following equation.

$$\text{Density (g/cm}^3\text{)=test sample mass (g)/test sample volume (cm}^3\text{)}$$

The test sample for measurement was obtained by cutting from a sample that had been left to stand for 72 hours or more after molding, to a size of 100 mm×100 mm×the original molded article thickness, and leaving it to stand for 16 hours or more in atmosphere conditions at a temperature of 23±2° C. and a humidity of 50±5%; or at a temperature of 27±2° C. and a humidity of 65±5%.

Solid Viscoelasticity of Expanded Molded Article

Figure 2:
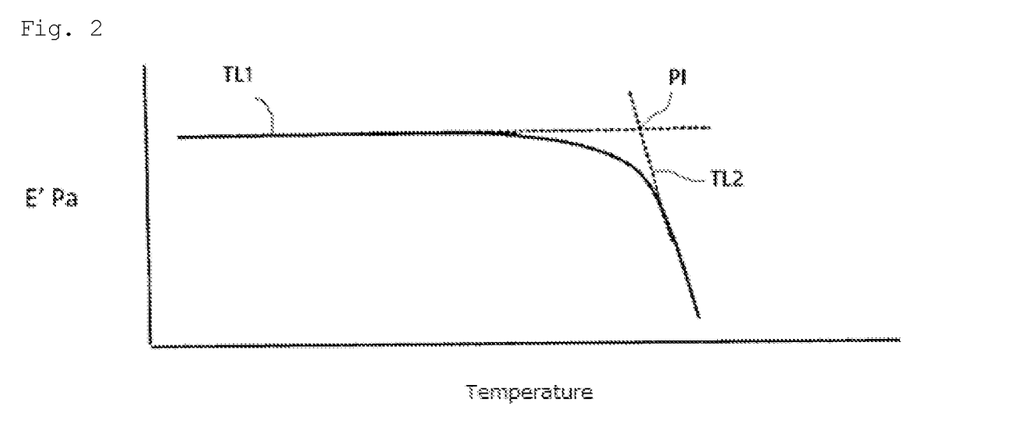
FIG. 2 is a graph explaining a calculation method for solid viscoelasticity.

For the solid viscoelasticity measuring device, an EXSTAR DMS6100 viscoelasticity spectrometer (manufactured by SII NanoTechnology, Inc.) was used. First, an expanded molded article was dried in an oven at 100° C. for 3 hours. Thereafter, pressing was performed at 200° C. for 5 minutes with a hot-pressing machine to obtain a measurement sample having a length of 40 mm, a width of 10 mm, and a thickness of 0.7 mm. The solid viscoelasticity was measured using the solid viscoelasticity measuring device in the tension control mode in a nitrogen atmosphere under the following conditions: a frequency of 1 Hz, temperature-rise rate of 5° C./min, measurement temperature of 30 to 220° C., chuck interval of 20 mm, strain amplitude of 5 μm, minimum tension/compression force of 20 mN, tension/compression force gain of 1.2, and force amplitude initial value of 20 mN. The temperature value at the intersection point of the tangents of the inflection points in the solid viscoelasticity graph obtained from the measurement was calculated. FIG. 2 shows a drawing example of the tangent lines TL1 and TL2, and the intersection point PI.

Example 1

(1) Resin Particles

One hundred parts by mass of an amide-based elastomer comprising nylon 12 as a hard segment and polytetramethylene glycol as a soft segment (product name "Pebax 5533," manufactured by Arkema), 2.0 parts by mass of an amide-based elastomer resin masterbatch containing carbon black as a pigment (component resin: "Pebax 5533," pigment concentration: 10 mass%, manufactured by Saika Color Co., Ltd.), and 0.3 parts by mass of an organic cell adjusting agent (product name "KAO WAX EB-FF" manufactured by Kao Corporation) were supplied to a single-screw extruder and melt-kneaded, thus obtaining an amide-based elastomer composition. In the single-screw extruder, the composition was first melt-kneaded at 180° C., and then melt-kneaded while increasing the temperature to 220° C.

Subsequently, the molten composition was cooled. Thereafter, the amide-based elastomer was extruded from each nozzle of a multi-nozzle mold provided at the front end of the single-screw extruder. The resin was extruded from each nozzle of the multi-nozzle mold (having 8 nozzles with a diameter of 1.0 mm) provided at the front end of the single-screw extruder, and cut in water at 30 to 50° C. The obtained resin particles had a particle length L of 1.0 to 1.4 mm and an average diameter D of 1.0 to 1.4 mm. The resin particles (composition) had a melting point of 160.5° C. and a crystallization temperature of 136.3° C.

(2) Expandable Particles

Fifteen kilograms (100 parts by mass) of the resin particles (average particle diameter: 1.2 mm) were placed in a heat-sealable, pressure-resistant rotary mixer having an inner volume of 43 liters. Further, 0.5 parts by mass of Epan 450 (manufactured by DKS Co. Ltd.) as an anti-fusing agent was added thereto, followed by stirring. While the resin particles were stirred, 16 parts by mass of butane (normal butane:isobutane=7:3) as a blowing agent was added thereto under pressure. The internal temperature was then increased to 70° C., and stirring was continued for 2 hours. Thereafter, the temperature was cooled to 20° C.; immediately after the pressure was decreased, the mixture was removed from the mixer, thus obtaining expandable particles.

(3) Expanded Particles

Two kilograms of the expandable particles was placed in a cylindrical pre-expanding machine equipped with a stirrer having an inner volume of 50 L, and allowed to expand while stirring with water vapor at 0.21 MPa, thus obtaining expanded particles having a bulk density of 0.09 g/cm$^3$. The resulting expanded particles were placed in a hermetically sealable container, nitrogen was added thereto under pressure at 0.5 MPa, and the container was allowed to stand at room temperature for 18 hours to thus impregnate the expanded particles with nitrogen.

(4) Expanded Molded Article

The expanded particles were removed from the hermetically sealable container, introduced into a mold cavity with a cavity having a size of 400 mm×300 mm×thickness 11.0 mm, and heated with water vapor at 0.25 MPa for 35 seconds for molding, thus obtaining an expanded molded article. The expanded molded article had a density of 0.10 g/cm$^3$ and a solid viscoelasticity of 152.3° C.

Example 2

An expanded molded article was obtained in the same manner as Example 1, except that an amide-based elastomer resin masterbatch containing copper phthalocyanine as a pigment (component resin: "Pebax 5533," pigment concentration: 10 mass %, manufactured by Saika Color Co., Ltd.) was used. The composition had a melting point of 161.1° C. and a crystallization temperature of 136.4° C. The expanded molded article had a density of 0.10 g/cm$^3$ and a solid viscoelasticity of 153.1° C.

Example 3

One hundred parts by mass of an ester-based elastomer (product name "PELPRENE P-75M," manufactured by Toyobo Co., Ltd.), 5.0 parts by mass of an ester-based elastomer resin masterbatch containing isoindoline as a pigment (component resin: "PELPRENE P-75M," pigment concentration: 10%, manufactured by Saika Color Co., Ltd.), and 0.3 parts by mass of an organic cell adjusting agent (product name "KAO WAX EB-FF" manufactured by Kao Corporation) were supplied to a single-screw extruder and melt-kneaded, thus obtaining an ester-based elastomer composition. Thereafter, the same procedure as Example 1 was followed to obtain an expanded molded article. The composition had a melting point of 153.7° C. and a crystallization temperature of 116.5° C. The expanded molded article had a density of 0.13 g/cm$^3$ and a solid viscoelasticity of 150.8° C.

Example 4

An expanded molded article was obtained in the same manner as Example 3, except that an ester-based elastomer resin masterbatch containing diketopyrrolopyrrole (DPP) as a pigment (component resin: "PELPRENE P-75M," pigment concentration: 10 mass %, manufactured by Saika Color Co., Ltd.) was used. The composition had a melting point of 153.5° C. and a crystallization temperature of 116.8° C. The expanded molded article had a density of 0.13 g/cm$^3$ and a solid viscoelasticity of 150.5° C.

Example 5

An expanded molded article was obtained in the same manner as Example 3, except that an ester-based elastomer resin masterbatch containing dichloroquinacridone as a pigment (component resin: "PELPRENE P-75M," pigment concentration: 10 mass %, manufactured by Saika Color Co., Ltd.) was used. The composition had a melting point of 154.1° C. and a crystallization temperature of 122.7° C. The expanded molded article had a density of 0.13 g/cm$^3$ and a solid viscoelasticity of 150.8° C.

Example 6

An expanded molded article was obtained in the same manner as Example 3, except that 5 parts by mass of an ester-based elastomer resin masterbatch containing carbon black as a pigment (component resin: "PELPRENE P-75M," pigment concentration: 10 mass %, manufactured by Saika Color Co., Ltd.) was used. The composition had a melting point of 153.2° C. and a crystallization temperature of 115.0° C. The expanded molded article had a density of 0.13 g/cm$^3$ and a solid viscoelasticity of 148.3° C.

Example 7

An expanded molded article was obtained in the same manner as Example 3, except that 10 parts by mass of an ester-based elastomer resin masterbatch containing carbon black as a pigment (component resin: "PELPRENE P-75M," pigment concentration: 10 mass %, manufactured by Saika Color Co., Ltd.) was used. The composition had a melting point of 153.9° C. and a crystallization temperature of 119.3° C. The expanded molded article had a density of 0.13 g/cm$^3$ and a solid viscoelasticity of 149.5° C.

Example 8

An expanded molded article was obtained in the same manner as Example 3, except that 5 parts by mass of an ester-based elastomer resin masterbatch containing copper phthalocyanine as a pigment (component resin: "PELPRENE P-75M," pigment concentration: 10 mass %, manufactured by Saika Color Co., Ltd.) was used. The composition had a melting point of 152.8° C. and a crystallization temperature of 121.9° C. The expanded molded article had a density of 0.13 g/cm$^3$ and a solid viscoelasticity of 148.8° C.

Example 9

An expanded molded article was obtained in the same manner as Example 3, except that 10 parts by mass of an ester-based elastomer resin masterbatch containing copper phthalocyanine as a pigment (component resin: "PEL-PRENE P-75M," pigment concentration: 10 mass %, manufactured by Saika Color Co., Ltd.) was used. The composition had a melting point of 151.2° C. and a crystallization temperature of 122.8° C. The expanded molded article had a density of 0.13 g/cm$^3$ and a solid viscoelasticity of 149.3° C.

Example 10

One hundred parts by mass of an olefin-based elastomer (product name "R110E," manufactured by Prime Polymer Co., Ltd.), 2.5 parts by mass of an olefin-based elastomer resin masterbatch containing carbon black as a pigment (component resin: polypropylene, pigment concentration: 20 mass %, manufactured by Toyocolor Co., Ltd.), and 0.3 parts by mass of an organic cell adjusting agent (product name "KAO WAX EB-FF," manufactured by Kao Corporation) were supplied to a single-screw extruder and melt-kneaded, thus obtaining an olefin-based elastomer composition. Thereafter, the same procedure as in Example 1 was followed to obtain an expanded molded article. The composition had a melting point of 153.6° C. and a crystallization temperature of 116.3° C. The expanded molded article had a density of 0.10 g/cm$^3$ and a solid viscoelasticity of 150.3° C.

Comparative Example 1

One hundred parts by mass of an amide-based elastomer comprising nylon 12 as a hard segment and polytetramethylene glycol as a soft segment (product name "Pebax 5533" manufactured by Arkema), and 0.3 parts by mass of an organic cell adjusting agent (product name "KAO WAX EB-FF," manufactured by Kao Corporation) were supplied to a single-screw extruder and melt-kneaded, thus obtaining an amide-based elastomer composition. Thereafter, the same procedure as in Example 1 was followed to obtain an expanded molded article. The expanded molded article had a density of 0.10 g/cm$^3$ and a solid viscoelasticity of 146.0° C.

Comparative Example 2

One hundred parts by mass of an ester-based elastomer (product name "PELPRENE P-75M," manufactured by Toyobo Co., Ltd.) and 0.3 parts by mass of an organic cell adjusting agent (product name "KAO WAX EB-FF," manufactured by Kao Corporation) were supplied to a single-screw extruder and melt-kneaded, thus obtaining an ester-based elastomer composition. Thereafter, the same procedure as in Example 1 was followed to obtain an expanded molded article. The expanded molded article had a density of 0.13 g/cm$^3$ and a solid viscoelasticity of 146.6° C.

Comparative Example 3

One hundred parts by mass of an olefin-based elastomer (product name "R110E," manufactured by Prime Polymer Co., Ltd.) and 0.3 parts by mass of an organic cell adjusting agent (product name "KAO WAX EB-FF," manufactured by Kao Corporation) were supplied to a single-screw extruder and melt-kneaded, thus obtaining an olefin-based elastomer composition. Thereafter, the same procedure as in Example 1 was followed to obtain an expanded molded article. The expanded molded article had a density of 0.10 g/cm$^3$ and a solid viscoelasticity of 146.2° C.

Table 1 shows the production conditions and various physical properties of Examples 1 to 10 and Comparative Examples 1 to 3. In the table, "AE" denotes amide-based elastomer, "EE" denotes ester-based elastomer, "OE" denotes olefin-based elastomer, "CB" denotes carbon black, "CuP" denotes copper phthalocyanine, "iso-I" denotes isoindoline, "DPP" denotes diketopyrrolopyrrole, and "di-ClQ" denotes dichloroquinacridone.

TABLE 1

| | Unit | Example | | | | | | | | | | Comparative Example | | |
| --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 1 | 2 | 3 |
| Resin | | AE | AE | EE | EE | EE | EE | EE | EE | EE | OE | AE | EE | OE |
| Pigment | | CB | CuP | iso-I | DPP | di-ClQ | CB | CB | CuP | CuP | CB | — | — | — |
| Pigment concentration | Parts by mass | 0.2 | 0.2 | 0.5 | 0.5 | 0.5 | 0.5 | 1.0 | 0.5 | 1.0 | 0.5 | — | — | — |
| Melting point (Tm) | ° C. | 160.5 | 161.1 | 153.7 | 153.5 | 154.1 | 153.2 | 153.9 | 152.8 | 151.2 | 153.6 | 160.1 | 147.9 | 155.6 |
| Crystallization temperature (Tc) | ° C. | 136.3 | 136.4 | 116.5 | 116.8 | 122.7 | 115.0 | 119.3 | 121.9 | 122.8 | 116.3 | 124.5 | 96.7 | 101.6 |
| (Tm − Tc) | ° C. | 24.2 | 24.7 | 37.2 | 36.7 | 31.4 | 38.2 | 34.6 | 30.9 | 28.4 | 37.3 | 35.6 | 51.2 | 54.0 |
| Solid viscoelasticity | ° C. | 152.3 | 153.1 | 150.8 | 150.5 | 150.8 | 148.3 | 149.5 | 148.8 | 149.3 | 150.3 | 146.0 | 146.6 | 146.2 |

As is clear from Table 1, the expanded molded articles obtained from the compositions containing a pigment exhibited improved heat resistance (solid viscoelasticity), compared to the expanded molded articles containing no pigment.

Test Example 2

Color Difference Measurement for Expanded Particles and Expanded Molded Article

The measurement was performed in accordance with the method described in JIS Z8722:2009 "Methods of colour measurement—Reflecting and transmitting objects." More specifically, the measurement was performed while holding the back of the expanded particles and expanded molded articles with a light source (field of view: D65/10°) using an SE-2000 Spectro Color Meter (manufactured by Nippon Denshoku Industries Co., Ltd.) and Color Mate 5 data processing software (manufactured by Nippon Denshoku Industries Co., Ltd.) by a reflection method with a dedicated white board. The color difference between the reference color and the color to be measured was measured, and a value ΔE* was obtained. Note that the measurement was performed using a test atmosphere standard plate with tristimulus values (C/2) of Y=96.09, X=94.13, and Z=113.36 after the test sample was allowed to stand at a temperature of 23±2° C. at a humidity of 50±5% for 24 hours or more.

Dark and Light Colors of Colored Expanded Particles and Colored Expanded Molded Article The dark and light colors of the colored expanded particles and colored expanded molded articles were visually observed. The evaluation was made according to the following criteria:

Dark and light colors were distinguishable: Yes

Only a uniform color was observed without dark and light colors, or the colors were not distinguishable: No Whiteness Degree of Expanded Molded Article The measurement was performed by a reflection method in accordance with the method described in JIS Z8722:2009 "Methods of colour measurement—Reflecting and transmitting objects." The measurement was performed using an SE-7700 Spectro Color Meter and Color Mate Pro data processing software (manufactured by Nippon Denshoku Industries Co., Ltd.). The test conditions were as follows: light source: D65/10° (viewing conditions) and sample area: (p28 mm. The whiteness degree WI was measured at three locations of the expanded molded article on a smooth surface with minimum steam slits, and the average value thereof was defined as a whiteness degree. Note that the measurement was performed in a test environment in which the temperature was 20±2° C. and the humidity was 65±5% after the test sample was allowed to stand at a temperature of 23±2° C. at a humidity of 50±5% for 24 hours or more. Before the measurement, calibration was performed using a standard plate. The standard plate was with tristimulus values) (D65/10°) of X=91.76, Y=96.87 and Z=103.75.

Examples 1 to 5, 7, and 9

Examples 1 to 5, 7, and 9 of Test Example 2 are the same as Examples 1 to 5, 7, and 9 of Test Example 1.

Example 11

Example 11 of Test Example 2 is the same as Example 10 of Test Example 1, except that the pigment concentration was changed from 0.5 parts by mass to 0.2 parts by mass.

Example 12

The resin particles were obtained in the same manner as Example 1.

The resulting resin particles (1.5 kg) were placed in an autoclave having an inner volume of 5 L, and the autoclave was hermetically sealed while the pressure was increased from atmospheric pressure to a gauge pressure of 3 MPa with carbon dioxide. After the autoclave was allowed to stand at room temperature for 24 hours, the pressure was decreased to obtain expandable particles. After the expandable particles were removed, the same procedure as in Example 1 was followed to obtain expanded particles and expanded molded articles.

Comparative Example 4

One hundred parts by mass of an amide-based elastomer comprising nylon 12 as a hard segment and polytetramethylene glycol as a soft segment (product name "Pebax 5533," manufactured by Arkema), and 0.3 parts by mass of an organic cell adjusting agent (product name "KAO WAX EB-FF," manufactured by Kao Corporation) were supplied to a single-screw extruder and melt-kneaded. Thereafter, the same procedure as in Example 1 was followed, thus obtaining resin particles of the amide-based elastomer composition.

Fifteen kilograms (100 parts by mass) of the resin particles (average particle diameter: 1.2 mm) were placed in a heat-sealable, pressure-resistant rotary mixer having an inner volume of 43 liters. Further, 0.5 parts by mass of Epan 450 (manufactured by DKS Co. Ltd.) as an anti-fusing agent and 0.2 parts by mass of a dye (OIL BLUE 630S, manufactured by Orient Chemical Co., Ltd.) were introduced thereinto, followed by stirring. While the resin particles were stirred, 12 parts by mass of butane (normal butane: isobutane=7:3) as a blowing agent was added thereto under pressure. The internal temperature was then increased to 70° C., and stirring was continued for 2 hours. Thereafter, the mixture was cooled to 20° C.; and immediately after the pressure was decreased, the mixture was removed from the mixer, thus obtaining expandable particles.

Thereafter, the same procedure as in Example 1 was followed to thus obtain a colored expanded molded article. The colored expanded molded article had a density of 0.10 g/cm$^3$.

Comparative Example 5

A colored expanded molded article was obtained in the same manner as in Comparative Example 4, except that the elastomer was changed to an ester-based elastomer. The colored expanded molded article had a density of 0.13 g/cm$^3$.

Comparative Example 6

A colored expanded molded article was obtained in the same manner as in Comparative Example 4, except that the elastomer was changed to an olefin-based elastomer. The colored expanded molded article had a density of 0.10 g/cm$^3$.

Table 2 shows the manufacturing conditions and various physical properties of the Examples and the Comparative Examples. In the table, "AE" denotes amide-based elastomer, "EE" denotes ester-based elastomer, "OE" denotes olefin-based elastomer, "CB" denotes carbon black, "CuP" denotes copper phthalocyanine, "iso-I" denotes isoindoline, "DPP" denotes diketopyrrolopyrrole, and "di-ClQ" denotes dichloroquinacridone.

As is clear from Table 2, the pigment-containing colored expanded molded articles of Examples 1 to 5, 7, 9, 11, and 12 had a darker color and better design properties, compared to the dye-containing colored expanded molded articles of Comparative Examples 4 to 6.

TABLE 2

|  |  | Unit | Example | | | | | | | | | Comparative Example | | |
|---|---|---|---|---|---|---|---|---|---|---|---|---|---|---|
|  |  |  | 1 | 2 | 3 | 4 | 5 | 7 | 9 | 11 | 12 | 4 | 5 | 6 |
| Resin |  |  | AE | AE | EE | EE | EE | EE | EE | OE | AE | AE | EE | OE |
| Pigment |  |  | CB | CuP | iso-I | DPP | di-ClQ | CB | CuP | CB | CB | Dye | Dye | Dye |
| Pigment concentration |  | Parts by mass | 0.2 | 0.2 | 0.5 | 0.5 | 0.5 | 1.0 | 1.0 | 0.2 | 0.2 | 0.2 | 0.2 | 0.2 |
| Colored expanded particles | Bulk density | g/cm³ | 0.09 | 0.09 | 0.12 | 0.12 | 0.12 | 0.12 | 0.12 | 0.09 | 0.09 | 0.09 | 0.12 | 0.09 |
|  | Dark and light colors |  | Yes | Yes | Yes | Yes | Yes | Yes | Yes | Yes | Yes | No | No | No |
|  | Color difference X − Y |  | 2.4 | 4.3 | 4.8 | 4.2 | 7.2 | 2.3 | 5.2 | 3.0 | 2.5 | 0.40 | 0.30 | 0.40 |
| Average cell diameter | Surface layer part A | μm | 75 | — | — | — | — | — | — | — | 120 | — | — | — |
|  | Central part B | μm | 55 |  |  |  |  |  |  |  | 52 |  |  |  |
|  | A/B |  | 1.4 | — | — | — | — | — | — | — | 2.3 | — | — | — |
| Colored expanded molded body | Density | g/cm³ | 0.10 | 0.10 | 0.13 | 0.13 | 0.13 | 0.13 | 0.13 | 0.10 | 0.10 | 0.10 | 0.13 | 0.10 |
|  | Dark and light colors |  | Yes | Yes | Yes | Yes | Yes | Yes | Yes | Yes | Yes | No | No | No |
|  | Color difference X − Y |  | 2.8 | 6.1 | 4.8 | 6.3 | 9.6 | 2.6 | 6.3 | 3.2 | 3.1 | 0.60 | 0.50 | 0.40 |
|  | Whiteness degree WI | % | 32.0 | — | — | — | — | — | — | — | 25.5 | — | — | — |

The invention claimed is:

1. Expanded particles of resin particles comprising a thermoplastic elastomer composition expanded with a blowing agent,
   the thermoplastic elastomer composition comprising:
   a thermoplastic elastomer having crystallinity and being selected from the group consisting of an amide-based elastomer, an olefin-based elastomer, an ester-based elastomer, and a urethane-based elastomer; and
   a pigment
   wherein the pigment is present in an amount of 0.05 to 3.0 parts by mass, per 100 parts by mass of the thermoplastic elastomer,
   wherein the expanded particles contain a plurality of cells satisfying a relationship of A>B, wherein A represents an average cell diameter at a surface layer part and B represents an average cell diameter at a central part, and
   wherein the surface layer part has an average cell diameter of 100 to 400 μm, and the central part has an average cell diameter of 10 to 200 μm.

2. The expanded particles according to claim 1, wherein the A and the B satisfy a relationship of A/B>1.5.

* * * * *